Sept. 6, 1938.　　　　T. M. BRUECK　　　　2,129,562
LENS AND DIAPHRAGM ASSEMBLY
Filed Feb. 17, 1938
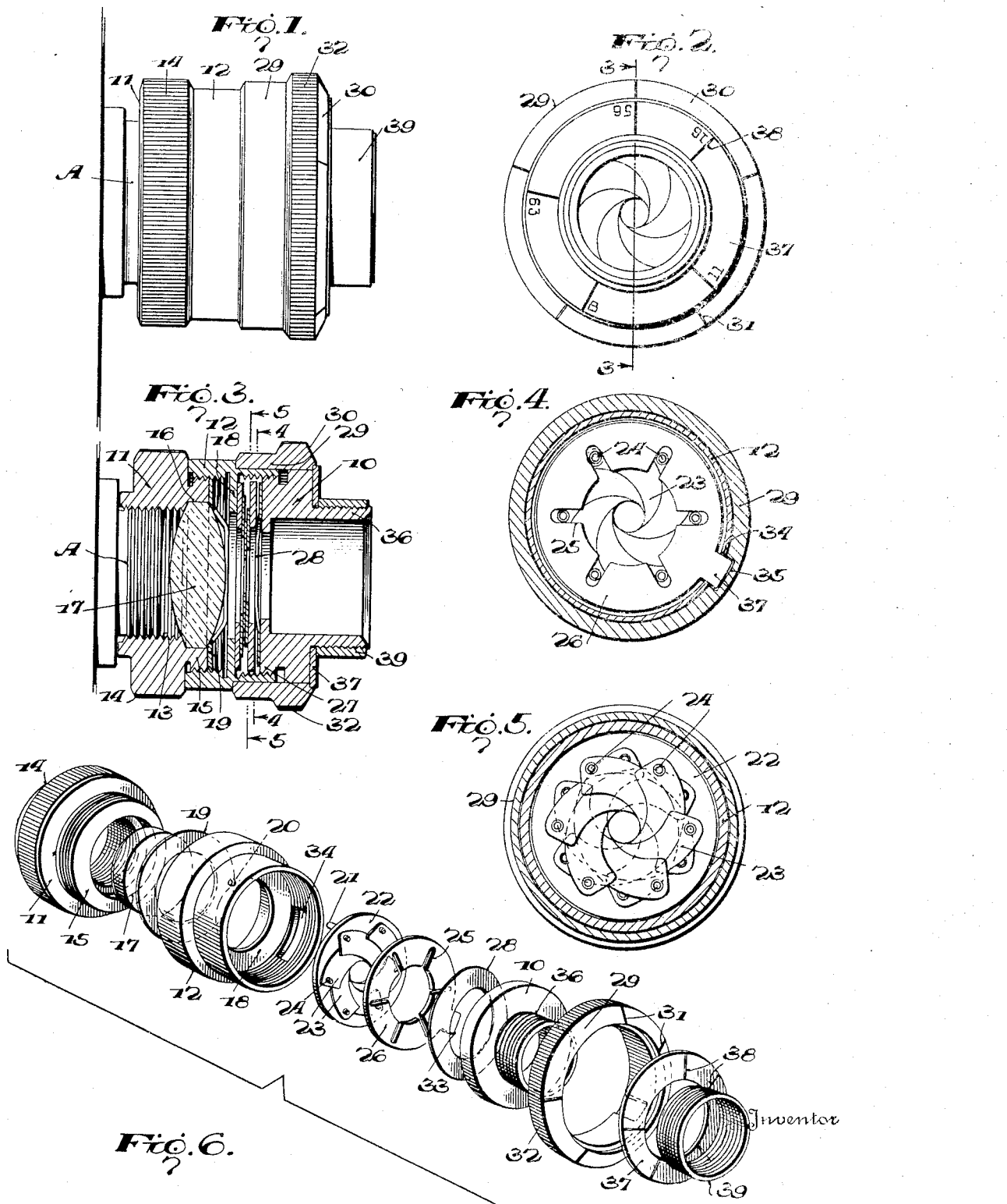
Inventor
Theodore M. Brueck.
By
Attorney Patented Sept. 6, 1938

2,129,562

UNITED STATES PATENT OFFICE 2,129,562

LENS AND DIAPHRAGM ASSEMBLY

Theodore M. Brueck, Rochester, N. Y., assignor to Ilex Optical Company, Rochester, N. Y., a corporation of New York Application February 17, 1938, Serial No. 191,100

6 Claims. (Cl. 95—64)

The present invention relates generally to lens and diaphragm mountings or assemblies as utilized in connection with miniature and other cameras, and has to do more particularly with an assembly of the type described and shown in my copending application filed August 21, 1937, under Serial No. 160,339, of which the present application is a continuation in part.

Generally speaking, the object of the present invention is the same as that in my former application insofar as a condensed or compact arrangement of the parts adaptable to threaded connection with a camera is concerned. On the other hand substantial features of novelty are proposed in the present improved construction, in the interest of greater strength, durability, increased efficiency and substantially simplified assembly.

All of the foregoing features will clearly appear in the course of the following description, detailing the construction, arrangement and operation as proposed by the present invention, in reference to the accompanying drawing, forming a part of the specification and in which:—

Fig. 1 is a side elevation of the improved assembly.

Fig. 2 is a front elevation thereof.

Fig. 3 is a vertical longitudinal sectional view taken therethrough on line 3—3 of Fig. 2.

Figs. 4 and 5 are vertical transverse sectional views taken respectively on lines 4—4 and 5—5 of Fig. 3, and Fig. 6 is a detailed perspective view of the several parts of the assembly in exploded relation.

Referring now to these figures the tubular casing of the present assembly is made up of front and rear tubular members 10 and 11, rigidly united in coaxial relation by means of an intermediate cylindrical body portion 12. It will be noted that the rear cylindrical member 11 is internally threaded as at 13 and particularly shown in Fig. 3 for engagement with the threaded portion A of a camera.

The rear cylindrical portion or member 11 has an external annular knurled portion 14 to facilitate the threading of the assembly as a whole on the camera portion A and at its forward end, member 11 has a reduced externally threaded portion 15 and, within this threaded portion 15, is provided with a counterbore 16 forming a seat for the lens 17.

The intermediate body portion 12 of the casing, having the cylindrical form previously described, is internally threaded and its rear portion engages the threaded portion 15 of the rear member 11 so that its intermediate internal annular ring 18 opposes the lens seat and may thus act as an abutment for a dished spring washer 19 which bears against the front edge of the lens 17 to hold the latter snugly on its seat in the assembled position.

The inner annular ring 18 of the cylindrical body portion just above mentioned is provided at one point with an opening 20 extending therethrough to receive a stud 21 projecting laterally from a diaphragm supporting ring 22 so that when the latter is seated against the forward face of the annular ring or flange 18, with the stud 21 projecting through opening 20, the diaphragm supporting ring 22 will thus be held against rotation.

The ring 22 supports a series of diaphragm blades 23, each blade having a projection 24 extending into one of the radial slots 25 of a diaphragm actuating disk 26, the latter of which seats in rotatable relation within the body portion of the casing forwardly of the diaphragm supporting ring 22.

The forward end portion of the cylindrical body 12 of the casing is reduced and its internal threads at its forward end engage a reduced threaded portion 27 of the front cylindrical member 10 whose inner end opposes the internal flange 18 of the body portion 12 of the casing and forms with the latter an annular compartment housing the diaphragm supporting ring 22 and the diaphragm actuating disk 26 as well as a curved or dished spring washer 28, the latter of which in the assembled position serves to engage the actuating disk 26 and yieldingly hold the same in effective engagement with the blades 23 of the diaphragm.

The forward cylindrical member of the casing which is thus in rigid connection with the forward portion of the cylindrical body 12 of the casing in substantially the same manner as the rear portion of the latter is in connection with the rear cylindrical member 11, is of the same external diameter as the reduced forward end of the cylindrical casing portion 12 to form with the latter an annular seat for the diaphragm adjusting ring 29 having a front beveled surface 30 adapted to receive an annular series of spaced index points or marks 31 and having a knurled annular portion 32 for facilitating its rotative movements.

As best seen in Figs. 4 and 6 the diaphragm actuating disk 26 is provided at one point with a peripheral, radially outstanding tongue 33 which projects externally through a circumferentially slotted opening 34 in that portion of the cylindrical body member 12 immediately forwardly of its internal annular flange 18, the extremity of the tongue 33 projecting slightly beyond the outer surface of the reduced portion of cylindrical casing member 12 for reception within a short longitudinal groove 35 in the internal surface of the adjusting ring 29.

The front casing member 10 has an externally threaded and substantially reduced, forwardly projecting neck portion 36 and its front surface around this neck portion forms a seat for clamping ring 37, the outer edge of which overlaps a portion of the adjusting ring 30 to hold the latter on its annular seat. The front face of this clamping ring 37 has a series of stop graduations 38, each of which cooperates independently with one of the index points 52 of the adjusting ring in the same manner and for the same purpose as in my previous application above mentioned.

Thus in the assembly of the parts it is simply necessary in the first instance to properly place the lens 17 in its seat in the forward portion of the rear casing member 11. The spring washer 19 is placed in position against the lens 17 and the rear end of the cylindrical body member 12 of the casing is threaded snugly and tightly on the rear member 11 so that the spring is forced snugly against the lens by the internal flange 18.

The diaphragm supporting ring 22 is then placed within the forward portion of the cylindrical body member 12 against the front surface of the flange 18 and its lug 21 aligned with and extended through the flange opening 20. The actuating ring 26 is then placed in position against the diaphragms after its radially outstanding tongue 33 has been extended through the circumferentially slotted opening 34 of the cylindrical casing member 12 and this disk is then shifted so that each of its radial slots 25 receives one of the blade projections 24. The spring washer 28 is then placed against the front surface of disk 26 and the front member 10 of casing screwed snugly and tightly into connection with the forward end of the cylindrical body member 12 so that the casing and its internal parts are thus complete.

The adjusting ring 29 is then telescoped over the front member 10 and the reduced forward portion of the cylindrical body 12. Clamping ring 37 is placed against the front surface of member 10 to confine ring 29 against rotatable displacement, and a clamping sleeve 39 is threaded upon the reduced forward neck 32 to engage the inner portion of clamping ring 37 so that when this sleeve 39 is tightened the ring 47 will be locked immovably in position.

To set the index, adjusting ring 29 which has received in its internal slot 35 a portion of the tongue 33 of the actuating disk 26, is rotated in a clockwise direction so as to shift the tongue 33 to its limit of movement in one direction within the slotted opening 34 and bring the several diaphragm blades into their position of widest opening. With the clamping sleeve 39 loosened the clamping and index ring 37 is shifted until one of its index points marked 5. 6 is exactly aligned with one of the stop graduations 31. The sleeve 39 is then tightened to clamp the index ring 37 tightly against movement and when the parts are thus position, as shown in Fig. 2 it will be noted that each of the index points 38 is relatively positioned circumferentially of ring 37 to cooperate with a separate stop graduation 31 for locating the diaphragm blades in their various other stop positions.

It is obvious from the foregoing that having thus constructed the various parts as described and provided for their relative disposition and engagement in the stated manner, the number of such parts has not only been reduced to a minimum, but their extremely ready and quick assembly has been promoted. Moreover, in actuating the shutter blades through a peripherally outstanding tongue 33 of the actuating disk, from the adjusting ring 29, it is obvious that this tongue may be of substantial width and the full thickness of the disk so as to defeat any possibility of shearing away the extremity of the tongue or that portion extending into the internal slot of the adjusting ring in the event the adjusting ring is severely manipulated as it will be with some users.

It is a well known fact that in most constructions of this character connection between the external adjusting ring and the internal shutter blades is usually brought about by pins. Such pins are necessarily small parts difficult to handle, subject to imperfect threads, and often too readily displaced. Moreover, such pins are delicate and easily sheared by novices in the use of photographic apparatus of this character, who are very likely to be heavy handed.

Thus the present construction, in addition to minimizing the number of the parts and providing for their ready, easy assembly, eliminates practical disadvantages of apparatus previously used for this purpose and presents a compact assembly which will be very efficient in use and insure long effective life.

What is claimed is:—

1. In a lens and diaphragm assembly, a cylindrical casing having intermediate the ends thereof an internal annular flange and provided with a circumferentially slotted wall opening forwardly of said flange and an internal lens seat rearwardly of the flange, means having bearing against said flange for confining a lens on said lens seat, a diaphragm holder having a non-rotatable support forwardly of and in connection with said flange, a diaphragm carried by said holder, a diaphragm actuating member operatively in connection with the diaphragm and having a peripheral extension projecting externally through the said slotted wall opening, a diaphragm adjusting member having a rotatable seat upon the exterior portion of the casing and having an internal longitudinally disposed recess receiving the said extension of the diaphragm actuating member, and means detachably in connection with the casing for confining the adjusting member on its said seat.

2. In a lens and diaphragm assembly, a cylindrical casing including front and rear portions and an intermediate internally threaded connecting portion into the opposite ends of which sections of the said front and rear portions are threaded, said intermediate casing portion having an internal annular flange spaced from the front and rear casing portions and a circumferentially slotted opening in the wall thereof forwardly of said flange, a lens seat formed internally of the rear casing portion adjacent to said flange, means having bearing on the flange for effectively holding a lens on said seat, a diaphragm holder supported against the front face of said flange, said flange and said diaphragm holder having relatively engaging means preventing rotation of said holder, a diaphragm carried by the holder, a diaphragm actuating member held effectively in connection with the diaphragm by the front portion of the casing and having a peripheral extension outstanding through the slotted opening of the intermediate portion of the casing, said front and intermediate casing portions forming exteriorly thereof an annular seat, a diaphragm adjusting member rotatable on said seat and having an internal recess receiving the outstanding end of said extension, and means carried by the front portion of the casing for confining said diaphragm adjusting member on its seat.

3. In a lens and diaphragm assembly, a cylindrical casing including front and rear portions and an intermediate internally threaded connecting portion into the opposite ends of which sections of the said front and rear portions are threaded, said intermediate casing portion having an internal annular flange spaced from the front and rear casing portions and a circumferentially slotted opening in the wall thereof forwardly of said flange, a lens seat formed internally of the rear casing portion adjacent to said flange, means having bearing on the flange for effectively holding a lens on said seat, a diaphragm holder supported against the front face of said flange, said flange and said diaphragm holder having relatively engaging means preventing rotation of said holder, a diaphragm carried by the holder, a diaphragm actuating member held effectively in connection with the diaphragm by the front portion of the casing and having a peripheral extension outstanding through the slotted opening of the intermediate portion of the casing, said front and intermediate casing portions forming exteriorly thereof an annular seat, a diaphragm adjusting member rotatable on said seat and having an internal recess receiving the outstanding end of said extension, a ring adjustably disposed against the front portion of the casing and overlapping and confining said adjusting member, and a sleeve threaded on the front portion of the casing and engaging and locking said ring.

4. In a lens and diaphragm assembly, a casing having therein a lens seat and an internal annular flange, and provided with a circumferentially slotted opening in a wall thereof, a diaphragm holder non-rotatably seated against said flange, a diaphragm carried thereby, a diaphragm actuating disk in operative engagement with the diaphragm and rotatable adjacent thereto, having an integral portion thereof radially outstanding through said slotted opening of the casing, a diaphragm adjusting member rotatably seated around a portion of the casing and having an internal recess receiving the said integral portion of the diaphragm actuating member, said adjusting member being shiftable lengthwise of the casing to and from its said seat, a ring at the front of the casing and radially overlapping the adjusting member for normally confining the said adjusting member on its seat and means for normally locking said ring in effective position.

5. In a lens and diaphragm assembly, a casing including front and rear end portions and an intermediate portion in threaded connection with said end portions and having an internal annular flange forming a support and opposing the inner ends of said end portions, said intermediate portion also having a circumferentially slotted opening through its wall at the forward side of said support, a lens seated between said support and the rear casing portion, a diaphragm holder stationarily engaging said support between the latter and the front casing portion, a diaphragm carried by the holder, a diaphragm actuating member in operative engagement with the diaphragm and having an integral peripheral projection outstanding through the wall opening, a diaphragm adjusting member rotatably seated around a portion of the casing and having an internal longitudinal recess receiving said projection, and means on the casing for normally confining said adjusting member on its seat.

6. In a lens and diaphragm assembly, a cylindrical casing including a rear member threaded for engagement with a camera and having an internal lens seat, a front member, and an intermediate member in threaded connection with said front and rear members and having a circumferentially slotted wall opening and an internal annular flange opposing the lens seat, a lens on said seat, a spring washer engaging the lens and having bearing against the rear face of said flange, said front member having a portion opposing and spaced from the front face of the flange and forming a diaphragm compartment, a diaphragm holder seated on and held from rotation by, the said front face of the flange, a diaphragm carried by said holder, a rotatable diaphragm actuating member in said compartment having operative engagement with the diaphragm and having a peripheral extension outstanding through said slotted opening of the intermediate member, a diaphragm adjusting member rotatably seated exteriorly of the front and intermediate members and having an internal longitudinally slotted opening receiving the outstanding extension of the actuating member, and means in connection with the front member for confining said adjusting member to its seat.

THEODORE M. BRUECK.